(No Model.)

G. B. WOODRUFF & T. W. R. McCABE.
SPEED CHANGING MECHANISM.

No. 560,958. Patented May 26, 1896.

Witnesses.
N. E. Hart.
Arthur B. Jenkins.

Inventors.
George B. Woodruff.
Thomas W. R. McCabe
by Chas. L. Burdett
Attorney.

UNITED STATES PATENT OFFICE.

GEORGE B. WOODRUFF AND THOMAS W. R. McCABE, OF WINSTED, CONNECTICUT, ASSIGNORS TO THE HARTFORD MACHINE SCREW COMPANY, OF HARTFORD, CONNECTICUT.

SPEED-CHANGING MECHANISM.

SPECIFICATION forming part of Letters Patent No. 560,958, dated May 26, 1896.

Application filed February 28, 1896. Serial No. 581,134. (No model.)

*To all whom it may concern:*

Be it known that we, GEORGE B. WOODRUFF and THOMAS W. R. McCABE, residing at Winsted, in the county of Litchfield and State of Connecticut, have invented certain new and useful Improvements in Speed-Changing Mechanism, of which the following is a full, clear, and exact description, whereby any one skilled in the art can make and use the same.

The object of our invention is to provide means whereby a shaft or like part may be driven at different rates of speed from the same source of power, as by means of a belt passing around a pulley or pulleys located on the shaft; and to this end our invention consists in the details of the several parts making up the device as a whole and in the combination of the several parts, as more particularly hereinafter described, and pointed out in the claims.

Figure 1:
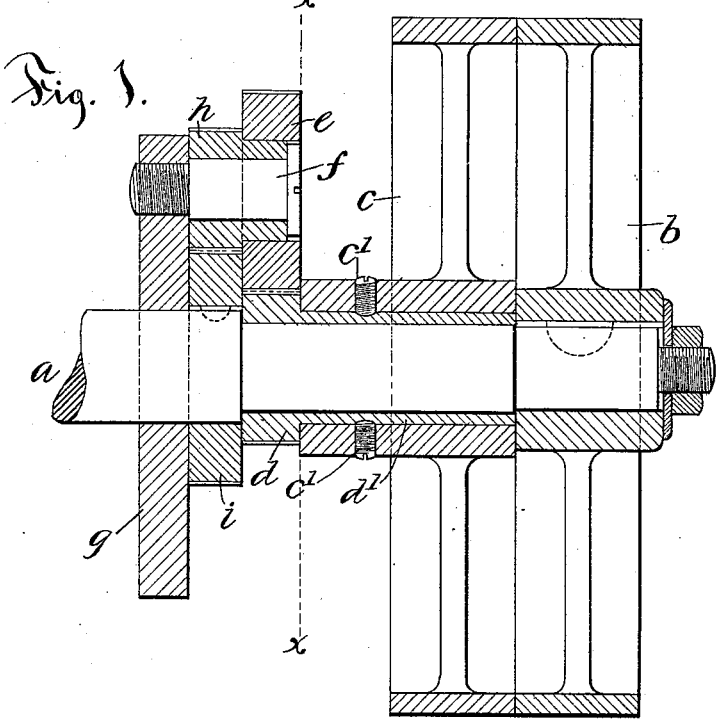
Figure 2:
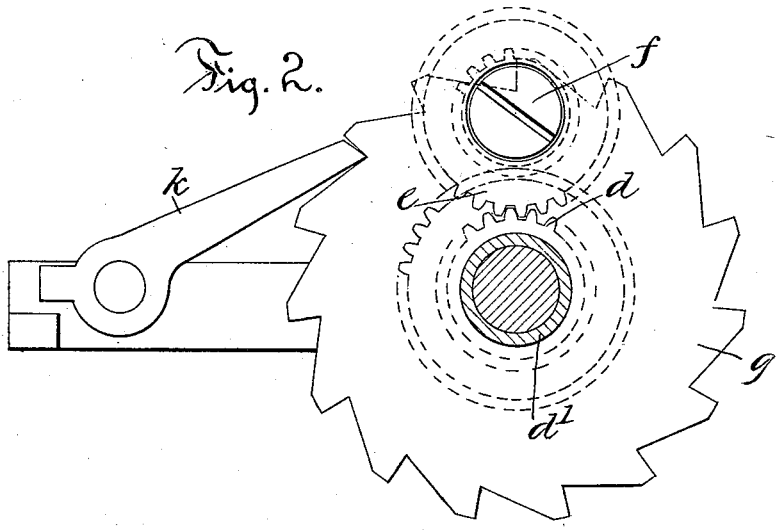

Referring to the drawings, Figure 1 is a view in central lengthwise section of the parts of our improvement located on the shaft. Fig. 2 is a view in cross-section through the parts on the dotted line *x x* of Fig. 1.

Our invention is designed for use more especially in connection with a screw-machine, the worm-shaft *a* being in operative engagement with the cam-shaft in such a machine. As no claim is made herein to any part of the machine, an illustration or description of any part other than the worm-shaft is deemed unnecessary. A pulley *b* is keyed to the worm-shaft *a* and a pulley *c* is loosely borne thereon. A belt from any suitable source of power passes around said pulleys to cause their rotation, and there is provided means whereby it may be shifted from one pulley to the other. A gear *d* is secured to the pulley *c*, in the present instance a sleeve *d'*, formed integral with the gear, being located within the hub of the pulley *c* and secured thereto by means of set-screws *c'*. The gear *d* is in mesh with a gear *e*, rotatively mounted on a stud *f*, this stud being secured to a ratchet-wheel *g*, loosely mounted on the shaft *a*. A gear *h* is also loosely mounted on the stud *f*, being secured to the gear *e*, the two rotating together, and is in operative engagement with a gear *i*, keyed to the shaft *a*. A pawl *k* is pivoted to the frame of the machine in position to engage the teeth of the ratchet-wheel *g*.

The operation of the device is as follows: The belt passing around the pulley *b* causes the worm-shaft *a* to be driven directly therefrom. The gear *i*, being secured to the shaft *a*, is also caused to rotate, and with it the gears *h* and *e*; but the gear *d* remains stationary, owing to the fact that the pulley *c* is at rest. The ratchet *g* is also rotated on the shaft *a* as the gears *h* and *e* are rotated, the latter revolving about the gear *d*. The belt being shifted to the pulley *c*, the gear *d* is driven in the same direction and the gears *e* and *h* in an opposite direction on the stud *f*. The pawl *k*, being in engagement with the ratchet-wheel *g*, holds the latter against rotation, which causes the gear *i* to be driven in the same direction as the pulley *c* and gear *d*, carrying with it the worm-shaft *a*, the latter revolving within the pulley *c* at a rate determined by the ratio of the gears with regard to each other. It will be seen from this construction that the rate at which the worm-shaft *a* will be driven through the medium of the pulley *c* may be varied by changing the ratio of the gears *d*, *e*, *h*, and *i*.

We claim as our invention—

1. In combination with a driving-shaft, a pulley keyed thereto, a pulley loosely mounted thereon, a gear secured to the loose pulley, a ratchet-wheel loosely mounted on the shaft, connected gears borne on the ratchet-wheel in mesh with a gear secured to the shaft, and the gear secured to the loose pulley, the gear secured to the shaft, and a pawl in engagement with the ratchet-wheel all substantially as described.

2. In combination with a driving-shaft, a pulley secured to the shaft, a pulley loosely mounted on the shaft, a gear secured to the loose pulley, a ratchet-wheel loosely mounted on the driving-shaft, a pawl in engagement with the ratchet-wheel a stud secured to the ratchet-wheel, and gears mounted on the stud and in engagement with the gear secured to the loose pulley and with a gear secured to the shaft, and the gear secured to the shaft, all substantially as described.

3. In combination with a driving-shaft, a pulley secured thereto, a pulley loosely mounted thereon, a gear secured to the pulley, a ratchet-wheel loosely mounted on the shaft, a pawl in engagement with the ratchet-wheel a stud secured to the ratchet-wheel, a gear rotatively mounted on the stud and in engagement with the gear secured to the loose pulley, a gear secured to the gear loosely mounted on the stud and in engagement with a gear secured to the shaft, and the gear secured to the shaft, all substantially as described.

GEORGE B. WOODRUFF.
THOMAS W. R. McCABE.

Witnesses:
  SAML. A. WETMORE,
  I. B. WOODRUFF.